(12) United States Patent
Tribout

(10) Patent No.: US 7,866,193 B2
(45) Date of Patent: Jan. 11, 2011

(54) ANTITHEFT-QUICK LOCK DEVICE FOR BICYCLE PARTS

(76) Inventor: Michel Tribout, 87, avenue des Vosges, 67000 Strasbourg (FR)

( * ) Notice: Subject to any disclaimer, the term of this patent is extended or adjusted under 35 U.S.C. 154(b) by 0 days.

(21) Appl. No.: 12/447,160

(22) PCT Filed: Oct. 26, 2006

(86) PCT No.: PCT/FR2006/002408

§ 371 (c)(1),
(2), (4) Date: Apr. 24, 2009

(87) PCT Pub. No.: WO2008/049977

PCT Pub. Date: May 2, 2008

(65) Prior Publication Data

US 2010/0212380 A1    Aug. 26, 2010

(51) Int. Cl.
*B62H 5/00* (2006.01)
*E05B 71/00* (2006.01)

(52) U.S. Cl. .............. 70/233; 70/201; 70/225; 70/229; 301/124.2; 403/315

(58) Field of Classification Search ............ 70/192, 70/201, 209, 210, 225, 226, 229, 230, 231, 70/232, 234, 235; 301/124.2; 403/315–320
See application file for complete search history.

(56) References Cited

U.S. PATENT DOCUMENTS

| | | | | |
|---|---|---|---|---|
| 4,724,692 A * | 2/1988 | Turin et al. | ............ | 70/225 |
| 5,027,628 A * | 7/1991 | De Rocher et al. | ......... | 70/233 |
| 5,135,330 A * | 8/1992 | Chen | ............ | 301/124.2 |
| 5,319,992 A | 6/1994 | Shui-Te | | |
| 5,479,836 A * | 1/1996 | Chang | ............ | 70/233 |
| 5,494,390 A * | 2/1996 | Gonzales | ............ | 301/124.2 |
| 5,526,661 A | 6/1996 | Lin | | |
| 5,813,258 A | 9/1998 | Cova | | |
| 6,152,541 A * | 11/2000 | Huber | ............ | 301/124.2 |
| 6,357,268 B1 * | 3/2002 | Takimoto | ............ | 70/208 |
| 6,499,810 B1 * | 12/2002 | Krahl | ............ | 301/124.2 |
| 6,758,380 B1 * | 7/2004 | Kolda | ............ | 403/320 |
| 7,513,133 B2 * | 4/2009 | Muerza | ............ | 70/233 |
| 2004/0244445 A1 * | 12/2004 | Denby | ............ | 70/233 |

FOREIGN PATENT DOCUMENTS

EP    0853034 A    7/1998
FR    2885344 A    11/2006

* cited by examiner

*Primary Examiner*—Suzanne Dino Barrett
*Assistant Examiner*—Christopher Boswell
(74) *Attorney, Agent, or Firm*—Young Law Firm, P.C.

(57) ABSTRACT

A combination antitheft—quick lock device for the wheels or saddle rod of a bicycle includes a lever connected to an eccentric and at least one rod having a threaded end for receiving a bearing washer and a nut. The eccentric bears upon and is rotationally linked to the bearing washer and to the threaded rod extending through the hub of the wheel. A guiding channel for at least one ball is formed as a blind channel in the lever, forming an obtuse angle relative to the longitudinal axis thereof. A bore is formed in the axis and opening into the channel and has a shoulder defining a widened recess. An eccentric reversible locking means includes a widened head configured for displacement in the widened recess and a rod guided by the channel and abutting the ball. A spring is disposed between the widened head and the bore shoulder.

9 Claims, 8 Drawing Sheets

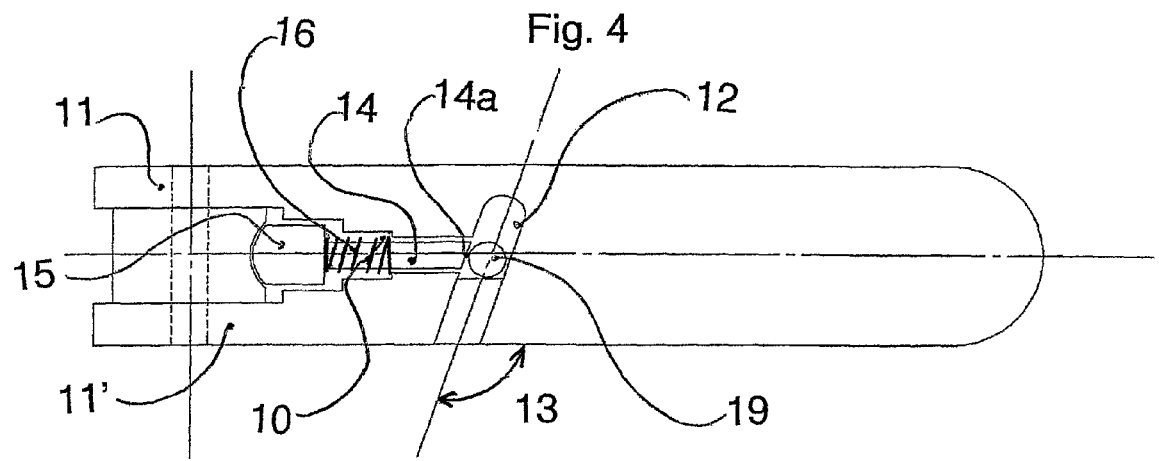
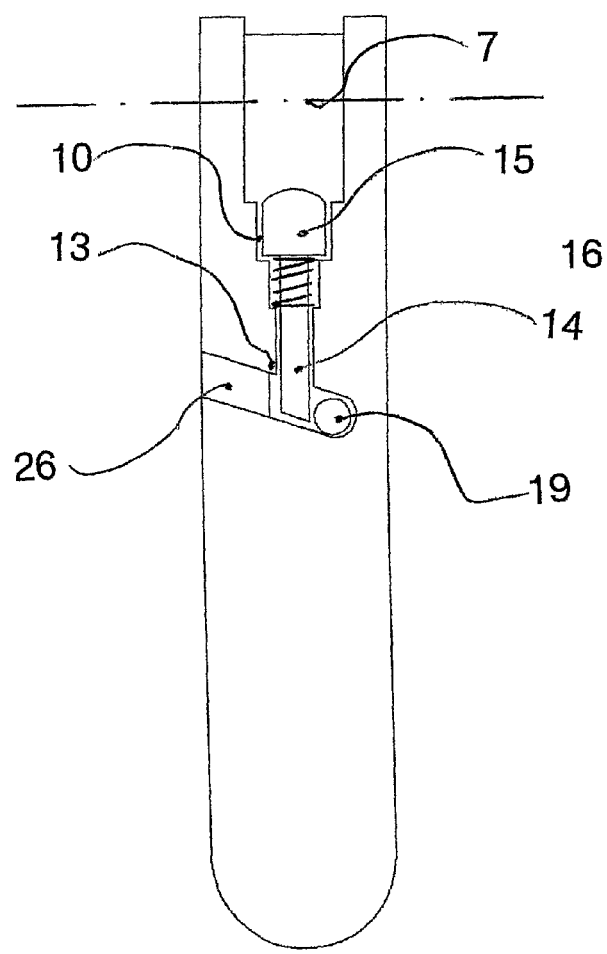
Fig. 5

ANTITHEFT-QUICK LOCK DEVICE FOR BICYCLE PARTS

BACKGROUND OF THE INVENTION

1. Field of the Invention

This invention relates to a bicycle part anti-theft device. It is particularly adapted to the rapid lockings mounted on the wheels or on the seat tube of bicycles.

2. Description of the Prior Art

More particularly, the anti-theft device-rapid blocking of bicycle parts, wheels and/or seat rode, the wheels are blocked on the front fork or on the rear seat stay by a fast locking system of the type with lever attached to an eccentric and at least one rod with threaded end receiving a support washer and a nut, said eccentric being as support and linked in rotation to said support washer and said threaded rod crossing from one part to the other the hub of the bicycle wheel.

The theft of the wheels of the bicycle and of the seat rod (tube carrying the seat) is frequent and poses a real problem for cyclists. In addition to the displeasure caused by the theft of major elements of the bicycle, the cyclist must replace the stolen parts. The theft of these elements of the bicycle is particularly easy and frequent when the bicycle is equipped with rapid-fastening clips.

In order to prevent this, the installation in the rapid fastening clip of a device prohibiting the opening of the latter is provided.

The existing devices attempting to solve this problem, whether they make use of a key or coded thumb wheel for coding, are not used very often since they require either carrying the key permanently or memorizing a combination. On the other hand, they can easily be ineffective, it is sufficient to exert a rotation of the locking lever to screw (the bolt) located on the other end of the axis of the wheel and as such release the latter.

In order to prevent the bicycle from being stolen, it is highly recommended to attach the latter to a fixed point using an anti-theft means of a known type (cables, etc.) generally hoops (or pins) are made available to cyclists as a fixed point. In this case, it is impossible to set up the bicycle vertically (+/−90°) on its rear wheel.

The reversal of the bicycle can be possible by sliding the anti-theft device along the tube of the hoop, however, positioning the bicycle arranged vertically on its rear wheel is impossible due to the length of the bicycle.

SUMMARY OF THE INVENTION

The problem addressed by embodiments of the present invention consists in prohibiting the theft of the wheels and/or of the seat rod.

This is obtained by a device according to embodiments of the present invention, which may include:
- a guiding duct of at least one ball, said duct being blind bore in the lever according to an obtuse angle in relation to the longitudinal axis of said lever
- in said axis a perforation exiting by a first end in said duct and by its second end directed towards the axis of rotation of said lever having a shoulder forming enlarged housing;
- a reversible means of blocking of the eccentric in relation to its pivot of the axis of rotation, said means of blocking comprising a mobile enlarged head in the enlarged housing and a guided rod in the duct going up to the stop on the ball, a spring placed between the enlarged head and the shoulder of the perforation maintaining said means of blocking on the pivot of the axis of rotation:
- in the first working position, bicycle in horizontal position (positioned on its wheels, blocking of the eccentric) the device is in clamped position, the means blocks and by its head prohibits the eccentric from rotating around the pivot,
- a straightening of the bicycle into a substantially vertical position, therefore of the lever displacing said means of blocking and said ball under the effect of gravity, ball separated from the perforation and first end of said rod in the duct releasing the eccentric in second working position.

According to other characteristics of the device according to the invention:
- the enlarged head has a perpendicular milling on each of its free faces which allows for three working positions,
- the duct is closed by a part of which the inside face in said duct is positioned slightly lower than the axis in a first working position, the ball via gravity coming into contact with said face,
- the end of the rod of the means of blocking is inclined according to the axis of the duct,
- the nut has a smooth exterior geometry in the form of a dome,
- the rapid blocking comprises two support washers, the first interacting with the eccentric, the second interacting with the nut, each washer having a protuberance is housed between the fingers of the fork in order to prohibit the rotation,
- the nut having a toothed surface as a ratchet supports on said second washer,
- the lever is curved in such a way as to hug the clamping collar positioned on the seat tube, in particular said collar having on its open portion for the clamping latitude two perforations passing from the closing of the collar by the threaded rod, the second perforation opposite the lever being tapped in order to accommodate the threaded portion of the rod.
- the guiding duct of the ball exits inside the fork of the eccentric.

BRIEF DESCRIPTION OF THE DRAWINGS

Embodiments of the present inventions will be more clearly understood by means of the following description, which relates to preferred embodiments, provided by way of non-restrictive example and in reference to the appended drawings, in which:

FIG. 4 shows a longitudinal cross-section of the lever of the device in FIG. 3 when the bicycle is horizontal with wheels on the ground.

FIG. 5 shows a longitudinal cross-section of the lever of the device in FIG. 3 when the bicycle is rendered vertically on its rear wheel.

DETAILED DESCRIPTION

Figure 1:
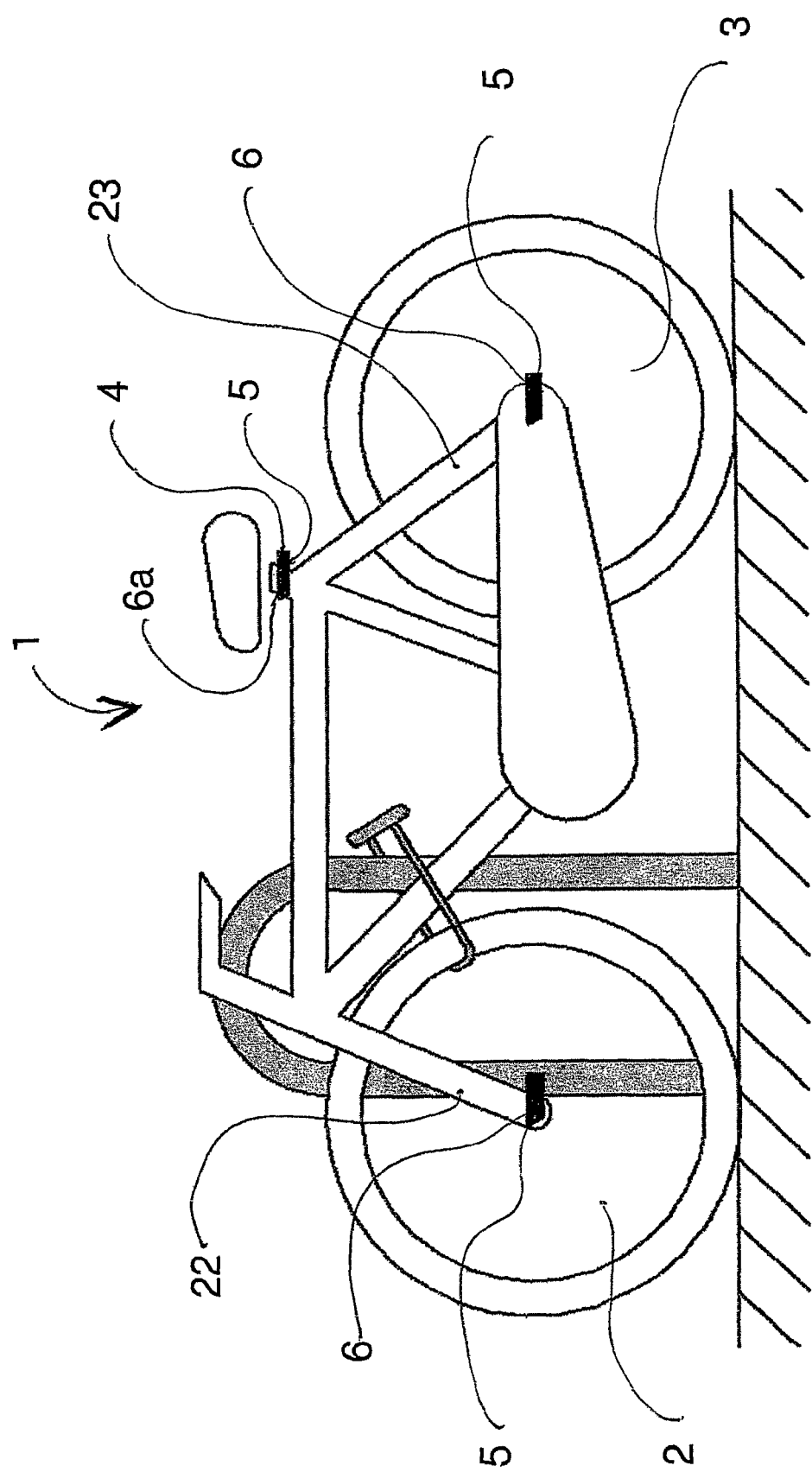
FIG. 1 is an elevational view of a bicycle in horizontal position with wheels on the ground attached to a fixed point and having three levers in horizontal position therefore locked by the device according to the invention.

The bicycle part anti-theft device 1, wheels 2 or seat rod 4 shown in the figures is located in the body of the lever 6 of the rapid blocking also called rapid fastening clip 5, it has for purpose to allow or not allow the rotation of the axis 7 activating the eccentric 8; this axis 7 connects the lever 6 from its eccentric portion 8 to the axial rod of the wheel 9.

It is comprised of an existing perforation 10 (FIGS. 4, 5) made longitudinally between the two fingers 11 of the eccentric 8 in the direction of the centre of lever 6 and of a guiding duct 12 crossing the perforation 10 and format an angle 13 with the latter, a sliding rod 14 provided with an enlarged support head 15 is displaced in the exiting perforation 10, this enlarged head 15 on the sliding rod 14 is mounted on spring 16 in order to maintain the latter in constant support on the axis of rotation formed by the axial head 18 of the wheel axis rod 17.

A free mobile ball, circulates in the guiding duct 12 providing in a particular position the blocking of the enlarged support head 15 and in another position the free circulation of this same support head 15.

Figure 2:
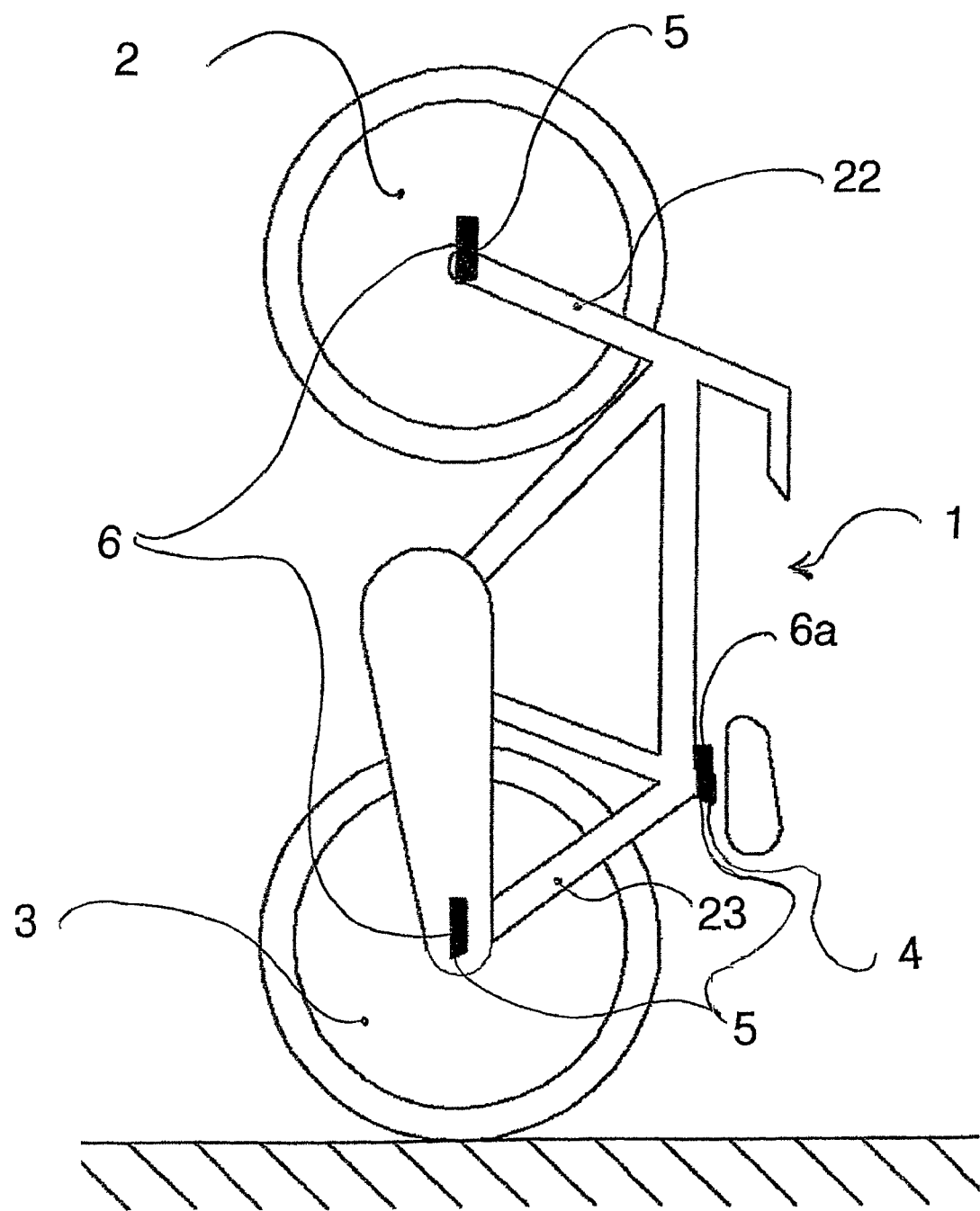
FIG. 2 shows an elevational view of the bicycle in FIG. 1 in position rendered vertically on its rear wheel, having the three levers in unlocked position, vertical.
Figure 3:
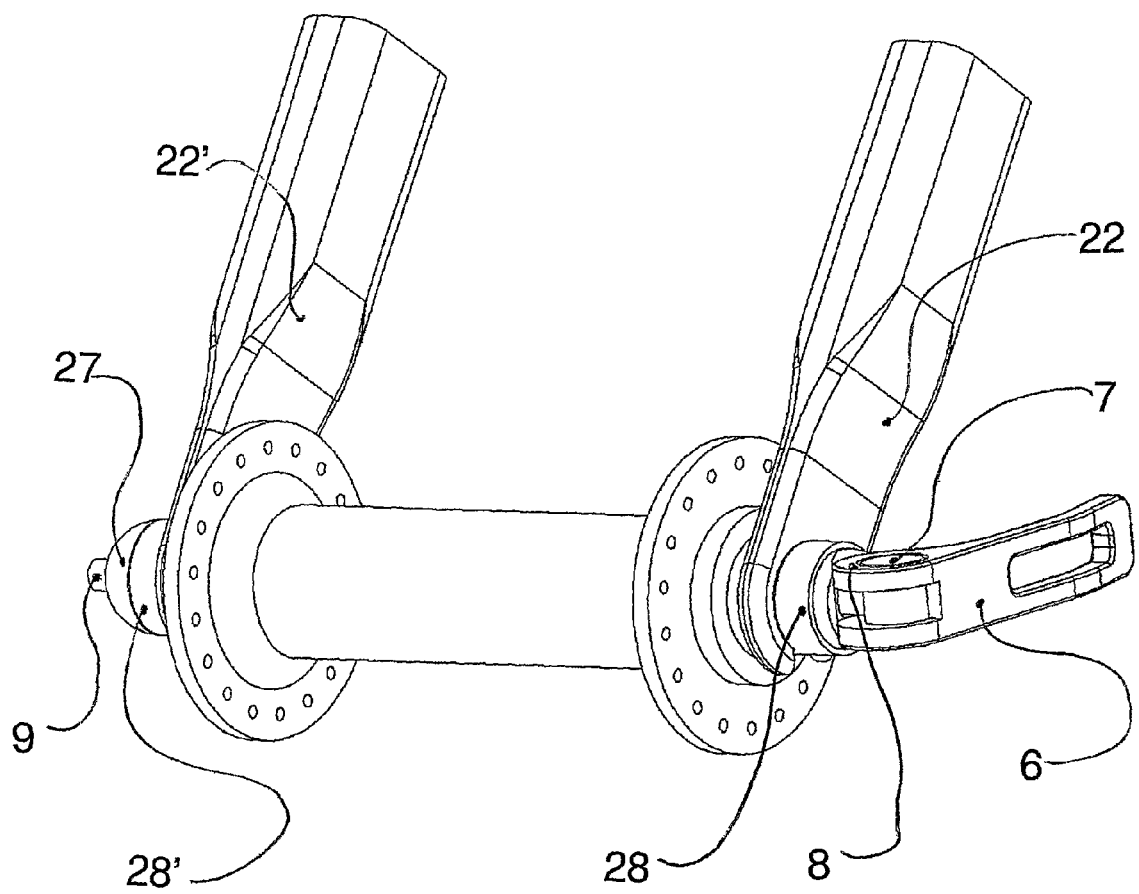
FIG. 3 shows an elevational view of the blocking device according to the invention on the hub of the fork of a front bicycle wheel corresponding to FIGS. 1 and 2.

The mobile element comprised by the ball 19 is displaced in the guiding duct 12 according to whether the bicycle 1 is in a normal position on its two wheels 2 and 3 (FIG. 1) or arranged vertically on its rear wheel 3 (FIG. 2).

According to the displacement of the sliding guided rod 14 provided with its enlarged head 15 under the double constraint of the compression spring 16 placed under the enlarged head 15 and rotation of the formatted head 18 comprising at least one milling 20, the ball 19 will circulate freely via its weight in its guiding duct 12 and must remain totally free in movement in order to fulfill its role of blocking or of releasing the opening of the lever 6.

For further clarity, examine the two substantial positions of the lever:

Bicycle 1 in normal position on its two wheels (FIGS. 1 and 4) and attached to a fixed point via an anti-theft device of known type, cable, hinged, etc. When the lever 6 is activated or closed in order to make use of the clamping produced by the eccentric 8, the enlarged head 15 of the guided rod 14 comes as a support of the most pronounced milling 20 made in the head of the axial rod 18 of the wheel, therefore, the guided rod 14 and therefore its enlarged head 15 under the effect of the compression spring 16 placed under the latter is displaced in the direction of the axis of rotation of the eccentric 7, this has for effect to sufficiently release the room to the ball 19 in its guiding duct 12 so that the latter, simply via its weight, is displaced in the extension of the guided rode 14 without however being under pressure with the guided rod 14.

In the event of an attempt to open, the guided rod 14 under the pressure exerted by the attempt to rotate the head of the milled axial rod 18 will be displaced slightly in the direction of the guiding duct 12 and will come as support against the ball 19 and will not be able to continue its movement.

For increased effectiveness, the end of the guided rod 14 corning as support against the ball 19 shall have an angle 13 at least equivalent to the angle formed by the perforation exiting 10 in the lever 6 and the guiding duct 12, this in order to prevent the ball 19 from escaping under the pressure of the guided rod 14 in its guiding duct 12 and no longer fulfilling its role.

In this normal position of the bicycle 1 on its two wheels 2, 3, the levers of the rapid-fastening clips or rapid lockings 5 are closed longitudinally to the bicycle 1 and in a rear position in relation to the axis of rotation 7, this is a safety in order to avoid any object or stems of shrubs which could become positioned between the lever 6 and the fork 22 or the toe piece of the bicycle 22, 23.

When the bicycle 1 is arranged vertically on its rear wheel 3 (FIGS. 2 and 5), the ball 19 can circulate freely under the effect of its own weight in the guiding duct 12, the guided rod 14 can then be displaced up to the guiding duct 12 making it possible to exert the rotation of the lever 6 with the eccentric 8, opening is therefore possible.

The ball 19 can circulate freely in the guiding duct 12 between the upper portion of the guided rod 14 advanced partially in the guiding duct 12 and the end of this same guiding duct.

In this configuration, the guided rod 14 with its enlarged head 15 is free to move, it is possible to unscrew the blocking or rapid fastening clip 5, it is possible to change a wheel 2, 3 or to adjust the height of the seat 4, to position via a screwing movement the axis of the wheel 17 or of the seat rod 4 and then to activate the eccentric 8 by reclosing the lever 6.

Figure 6:
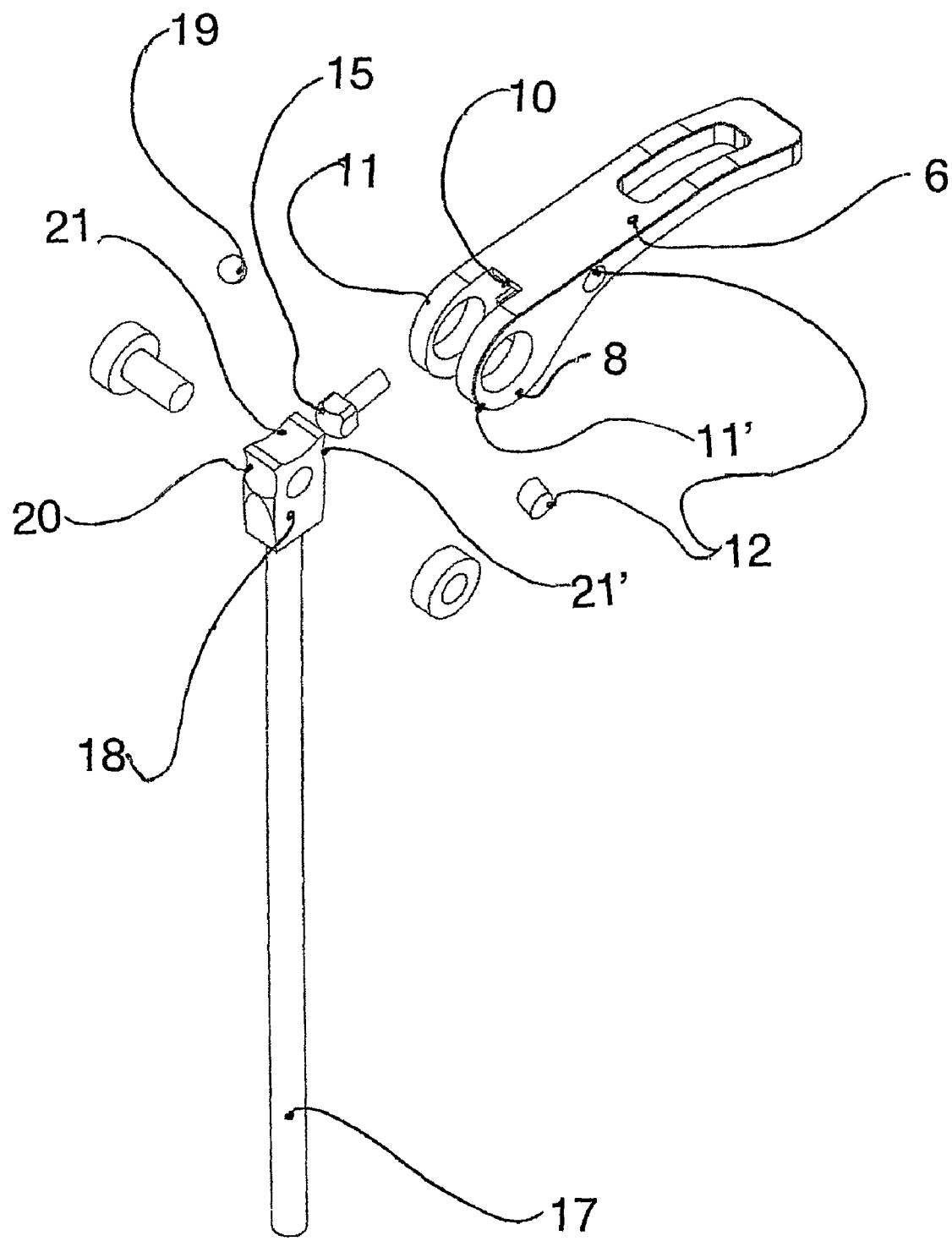
FIG. 6 partially shows the device in FIG. 1 as an exploded view.

Another advantage of the invention is to have two intermediary positions in addition to the locked position (FIG. 6), these two intermediary positions largely facilitating the manipulation of the lever 6, these two positions such as that of locking are obtained via the double effect of the spring 16 that constrains the enlarged head 15 of the rod 14 guided by pressure under the enlarged head 15 to come and house itself, second effect, at the maximum of milling 20 in the head of the axial rod 18 of the wheel 2 or 3, this formatted head, milled 18 has three millings 20, 21, 21', a major milling 20 allowing the guided rod 14 to advance in the direction of the axis of rotation 7 under the effect of the compression spring 16 releasing the space sufficient for the ball 19 to take its position in alignment of the guided rod 14 in its guiding duct 12, two lighter millings 21 and 21' allowing the intermediary positions by requiring the ball 19, regardless of the position of the lever 6, to remain inactive in its guiding duct 12, i.e. underneath the guided rod 14.

Figure 7:
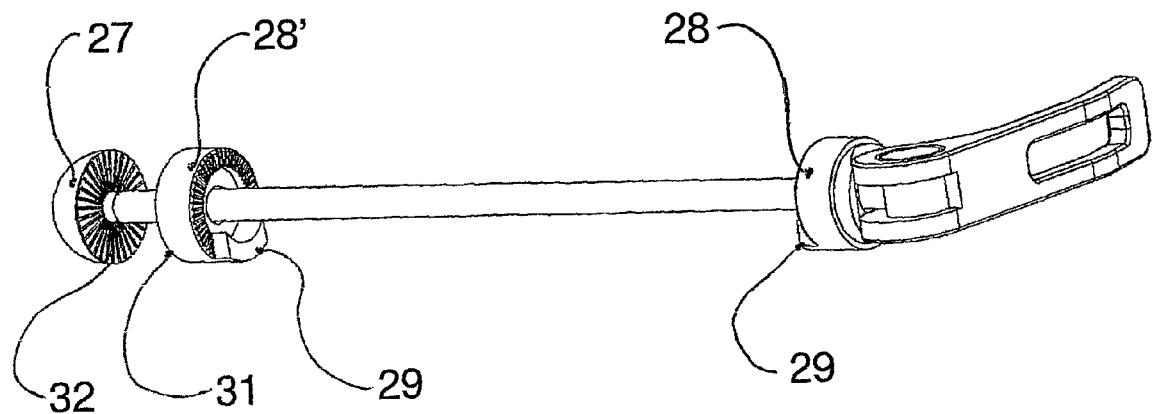
FIG. 7 shows an elevational view of an embodiment of the device with two support washers.

In order to be fully effective, the wheel anti-theft device for rapid-fastening clips must be provided with a nut 27 (FIG. 7) having a smooth exterior geometry and in the form of a dome in order to render difficult the grasping with a hand tool with the purpose of rescrewing the axis of the wheel positioned opposite the lever 6 activating the eccentric 8.

Figure 8:
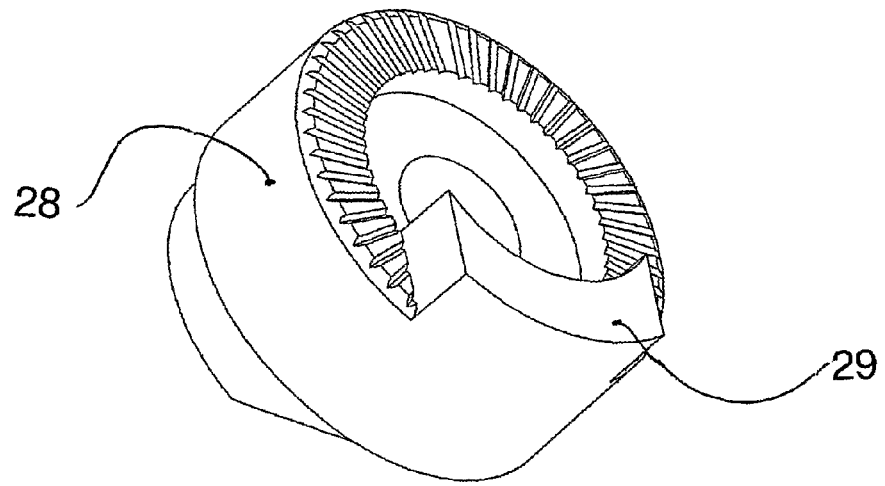
FIG. 8 shows an elevational view of a toothed washer of the device in FIG. 10.

For the same purpose, two support washers 28, 28' having a protuberance 29 housed between the fingers of the fork 22, 22' in order to prohibit the rotation are placed at the two ends of the axial rod 9 of the wheel 2, 3, the first 28 (FIG. 8) interacting with the eccentric 8, the second 28' interacting with the smooth nut 27.

The support washer 28' has a toothed surface 31 as a ratchet, this toothed surface 31 comes into contact with the toothed surface 32 of the nut 27 in the form of a dome in order to allow for the screwing and to prevent the unscrewing when the clamping is carried out by the eccentric.

Figure 11:
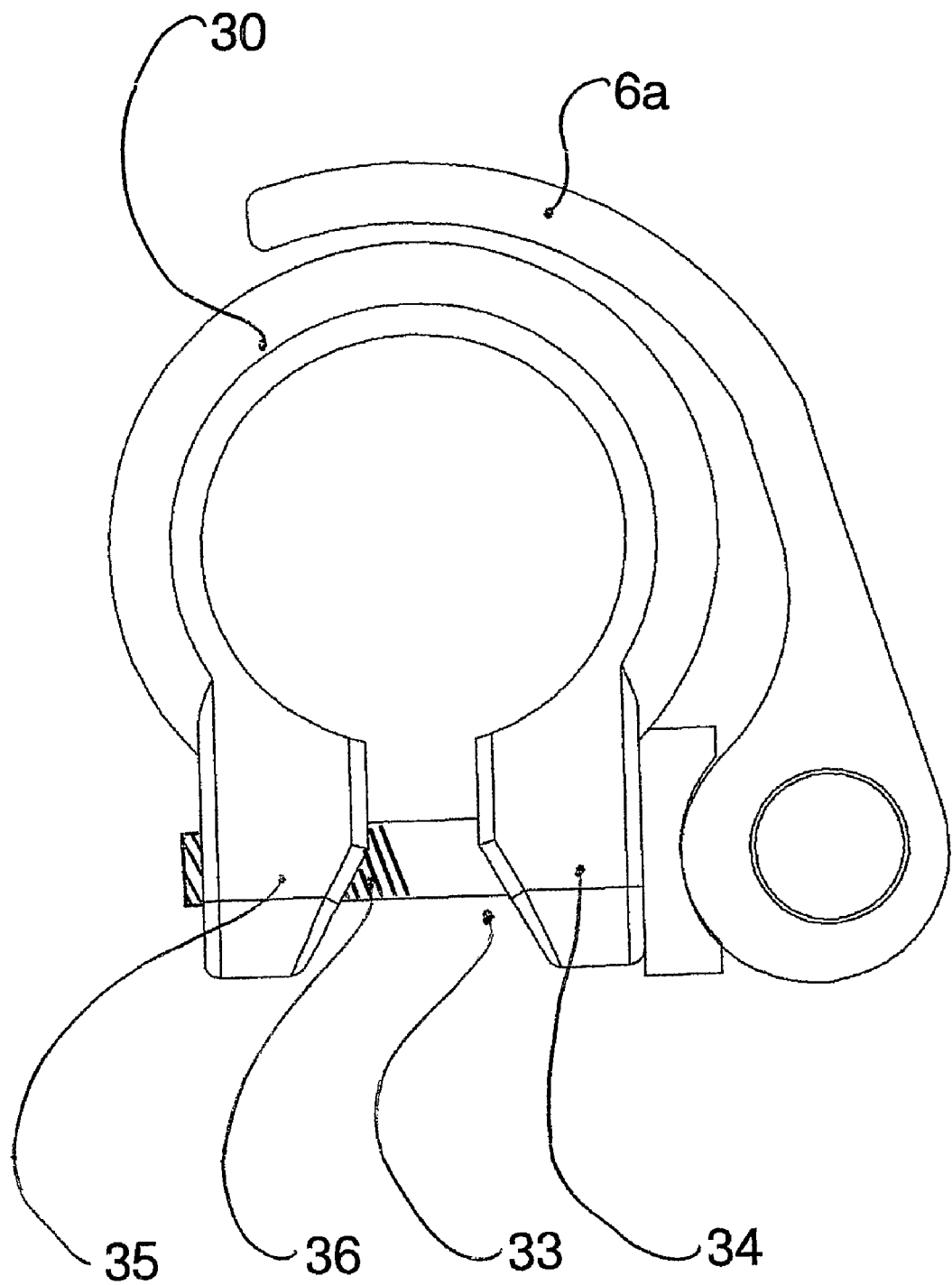
FIG. 11 shows a rapid seat fastening clip with an alternative lever according to the invention, lever that is curved to hug said collar.

For the rapid blocking of the seat (FIG. 11) a preferred embodiment is that for which the lever 6 is curved in such a way as to hug the clamping collar 30 positioned on the seat tube.

This form of lever 6a by clamping the collar 30 prohibits the unscrewing when the rapid fastening clip is closed and in locked position, i.e. the bicycle on its two wheels. The lever 6 during an attempt of unscrewing would strike the seat rod.

This clamping collar 30 has on its open portion 33 for the clamping latitude passing perforations 34 and 35 closings of the collar by the threaded rod 36. The second perforation 35 opposite the lever 6a is tapped in order to accommodate the threaded portion of the rod 36.

Figure 9:
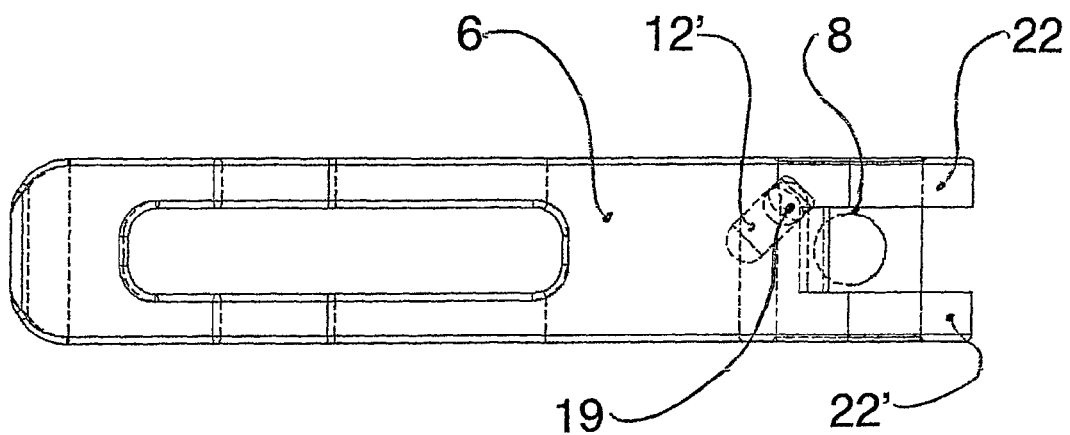
FIGS. 9 and 10 show in an elevational view with a partial cross-section an alternative of the lever according to the invention wherein the guiding duct of the ball exits directly inside the fork of the eccentric.
Figure 10:
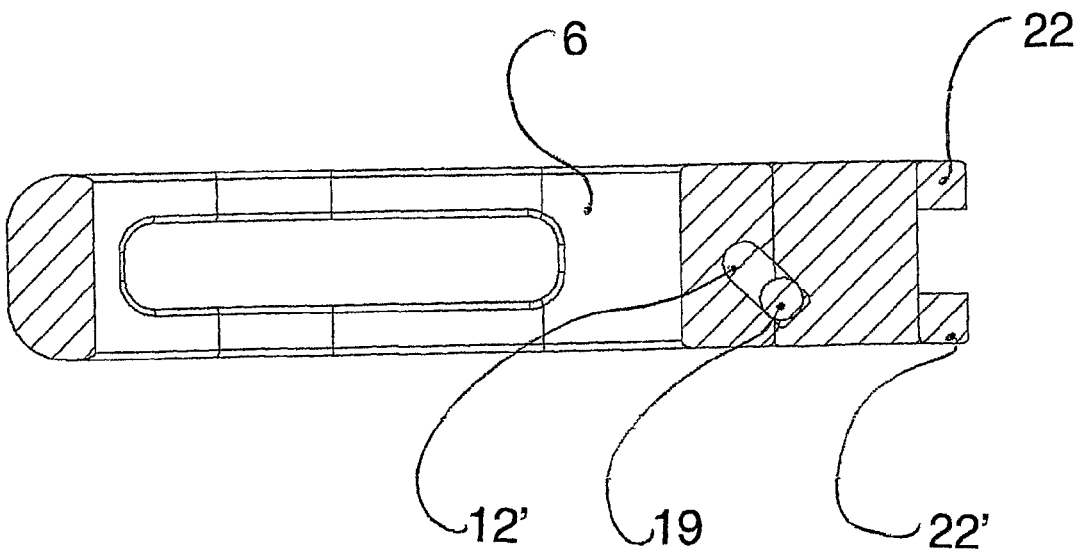

According to another embodiment (FIGS. 9, 10), the guiding duct 12' of the ball 19 exits inside the fork of the eccentric 8.

The operation remains identical with the single difference that the ball 19 is displaced from its guiding duct 12' to a perforation made in the axis of rotation 8.

The movement of the ball 18 is provided by its own weight according to whether the bicycle is in a normal position on its two wheels (FIG. 1) or arranged vertically on its rear wheel (FIG. 2).

REFERENCE SIGNS

1. Bicycle
2. Front wheel
3. Rear wheel
4. Seat rod
5. Rapid fastening clip or rapid locking
6. Lever
6a. Lever
7. Axis of the eccentric
8. Eccentric
9. Axial rod of the wheel
10. Existing perforation
11. Fingers of the eccentric
11'. Fingers of the eccentric
12. Guiding duct
12'. Guiding duct
13. Angle (exiting perforation/guiding duct)
14. Sliding guiding rod
14a. End of the rod
15. Enlarged head
16. Spring
17. Axial wheel rod
18. Axial head of the wheel axis rod
19. Ball
20. Greatest milling
21. Minor milling
21'. Minor milling
22. Fork
22'. Fork
23. Toe piece
24. Fixed point
25. Padlock
26. Part forming the guiding duct
27. Dome nut
28. Toothed washer with protuberance
29. Protuberance
30. Clamping collar
31. Toothed surface of the washer with protuberance
32. Toothed surface of the nut
33. Open portion of the clamping collar
34. Perforation for passage of clamping rod
35. Tapped perforation
36. Threaded rod The sole purpose of the reference signs inserted after the technical characteristics mentioned in the claims is to facilitate the understanding of the latter and do not in any way limit the scope.

Although the invention has been described in liaison with particular structures, it is in no way limited to them and many alternatives can be provided.

The combinations of the different embodiments shown in the figures or described hereinabove do not depart from the scope of the invention.

What is claimed is:

1. An anti-theft—quick lock—device for bicycle parts, wheels and/or seat rod, the wheels being blocked on the front fork or on the rear seat stay by a fast locking system of a lever attached to an eccentric and at least one rod having a threaded end receiving a bearing washer and a nut, said eccentric bearing against and linked in rotation to said bearing washer and to said threaded rod extending through the hub of the bicycle wheel comprising:

a guiding channel configured to accommodate at least one ball, said guiding channel defining a blind channel in the lever at an obtuse angle with respect to to a longitudinal axis of said lever, said axis defining a bore opening at a first end in said guiding channel and at a second end directed towards an axis of rotation of said lever, having a shoulder forming a widened recess, a reversible means for blocking the eccentric with respect to its pivot of the axis of rotation, said reversible blocking means comprising a mobile enlarged head disposed in the widened recess and a rod guided within the guiding channel and abutting the ball, a spring placed between the enlarged head and the shoulder of the bore maintaining said reversible blocking means on the pivot of the axis of rotation, wherein—when the bicycle is in a horizontal position in which the bicycle is on its wheels and the eccentric is blocked, the device is in a clamped position in which the reversible blocking means is blocked and in which the head prohibits the eccentric from rotating about the pivot, and wherein when the bicycle is in a substantially vertical position, the lever displaces said reversible blocking means and, under the effect of gravity, said ball separates from the bore and the first end of said rod in the guiding channel releases the eccentric.

2. Device according to claim 1, wherein the enlarged head has a perpendicular milling on each of its free surfaces.

3. Device according to claim 1, wherein the guiding channel is closed by a part defining an interior surface in said guiding channel that is positioned slightly lower than the axis when the bicycle is on its wheels, the ball by gravity coming into contact with said interior surface.

4. Device according to claim 1, wherein the reversible blocking means defines an end that is inclined according to the axis of the duct.

5. Device according claim 1, wherein the nut has a smooth exterior geometry in the form of a dome.

6. Device according claim 1, further comprising a first and a second support washer, the first support washer interacting with the eccentric, the second support washer interacting with the nut, each of the first and second washers defining a protuberance that is housed between the fingers of the fork in order to prohibit rotation.

7. Device as claimed claim 1, wherein the nut defines a toothed surface that bears upon said second washer.

8. Device according to claim 1, wherein the lever is curved in such a way as to hug a clamping collar positioned on the seat rod, said collar having on its open portion two bores passing from the closing of the collar by the threaded rod, the second bore opposite the lever being tapped to accommodate the threaded portion of the rod.

9. Device according to claim 1, wherein the guiding channel for the ball emerges inside the fork of the eccentric.

* * * * *